United States Patent
Mahoney et al.

(10) Patent No.: US 7,677,077 B2
(45) Date of Patent: Mar. 16, 2010

(54) SENSOR CALIBRATION DEVICE AND METHOD FOR A TIRE

(75) Inventors: John Michael Mahoney, Munroe Falls, OH (US); Robert Edward Daly, Jr., Uniontown, OH (US); Steven Carl Justice, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 555 days.

(21) Appl. No.: 11/643,113

(22) Filed: Dec. 21, 2006

(65) Prior Publication Data
US 2008/0148805 A1 Jun. 26, 2008

(51) Int. Cl.
*G01B 3/30* (2006.01)
(52) U.S. Cl. ...................................................... 73/1.79
(58) Field of Classification Search ................. None
See application file for complete search history.

(56) References Cited

U.S. PATENT DOCUMENTS 3,644,047 A * 2/1972 Brown et al. ................ 356/458
5,007,738 A * 4/1991 Grant ...................... 356/243.4
2001/0040682 A1* 11/2001 Lindsay et al. ............. 356/520
2001/0052259 A1* 12/2001 Mahner ....................... 73/146
2006/0083347 A1* 4/2006 Nosekabel et al. ............ 378/61

* cited by examiner

*Primary Examiner*—Robert R Raevis
(74) *Attorney, Agent, or Firm*—Richard B. O'Planick

(57) ABSTRACT

A sensor calibration device and method of construction for a force variation machine includes a circular plate having a test measurement region defined thereon. The test measurement region has a circumferentially extending inner track and a circumferentially extending outer track, the outer track having a projection and a valley for sidewall bulge and valley simulation formed therein and the inner track having a first and a second step formed therein separating the inner track into outward and inward inner track portions. A circumferentially extending radial edge track is provided having a first and a second step formed therein separating the edge track into outward and inward edge track portions. The projection and valley on the outer track have a depth equivalent to tire sidewall bulge and valley limits, respectively. The first and second steps in the inner track have a depth equivalent to a tire lateral run-out limit. The first and second steps in the edge track have a depth equivalent to a radial run-out limit.

17 Claims, 3 Drawing Sheets

SENSOR CALIBRATION DEVICE AND METHOD FOR A TIRE

FIELD OF THE INVENTION

The invention relates generally to a sensor calibration device and method of construction and, more specifically, a calibration check device for tire run-out sensors in a Force Variation Machine.

BACKGROUND OF THE INVENTION

A Force Variation Machine (FVM) is commonly used within the tire industry for measuring tire uniformity in order to insure that manufactured tires are within run-out limits. Commercial FVM units utilize sensors to measure and verify that tires are within lateral run-out, radial run-out, and sidewall bulge and valley limits. The sensors deployed may be laser non-contact or contact devices. When positioned at known locations to a tire, the sensors deploy a laser beam against the tire to determine whether the tire conforms to tire specifications or must be scrapped.

It is imperative, therefore, that sensors employed in FVM be accurate and dependable. Without a method and apparatus for verifying the accuracy of the non-contact sensors on FVMs, it is not possible to determine whether tires within run-out limits are being scrapped or tires not within run-out limits are being passed. Quality control becomes problematic if improperly calibrated sensors are utilized.

Currently, run-out sensors for FVMs are calibrated using "check tires". Check tires are constructed using existing rubber building machinery and methods. While care is exercised in the production of a check tire, the check tires still may be inhomogeneous and non-uniform and such tires may not possess consistent run-out. As a result, check tire non-uniformity may influence the accuracy of FVM run-out sensor calibration. Due to inaccuracies in verifying run-out sensor calibration using current check tire practices, a possibility exists that tires continue to be scrapped when technically within acceptable run-out limits and other tires will not be scrapped when run-out is outside of acceptable limits. There remains, accordingly, a need for a more accurate means of verifying the calibration of the run-out sensors on FVMs.

SUMMARY OF THE INVENTION

In one aspect of the invention, a sensor calibration device for a tire measuring force variation machine includes a substantially circular rigid plate and having a plurality of tracks designated on the plate, each track having an anomaly incorporated therein configured and located to simulate measured runout in a tire. The first track anomaly may simulate lateral runout and the second track anomaly radial runout in a tire. The first track anomaly and second track anomaly may comprise steps disposed within track surfaces, the steps having depths corresponding with preselected radial and lateral runout limits in a tire, respectively.

Pursuant to another aspect of the invention, the plate includes a third track having an incorporated anomaly that simulates bulge and valley conditions in a tire.

According to another aspect of the invention, a method of constructing a sensor calibration device for a tire measuring force variation machine includes: identifying in a substantially circular rigid plate a plurality of tracks, each track having an anomaly incorporated therein configured and located to simulate measured runout in a tire; configuring a first anomaly into the a first track to simulate lateral runout and a second anomaly into a second track to simulate radial runout in a tire.

The method may further include configuring the first track anomaly and the second track anomaly as respective steps; and configuring the steps in the first and second tracks to have a depth substantially equivalent to pre-selected tire radial and lateral run-out limits, respectively.

The method may further include configuring a third anomaly into a third track to simulate bulge and valley conditions in a tire and configuring the third track anomaly as a projection and recess having respective depths corresponding with bulge and valley limits of a tire.

DEFINITIONS

"Force Variation": the differential response of a rolling tie to radial (parallel to wheel plane-equatorial plane) and lateral (perpendicular to wheel plane-axial) stresses.

"Runout": the variation in physical dimensions (radius, width) around the tire; a measure of out-of-roundness.

"Radial tire runout": the difference between the maximum and minimum measurements on the tread surface and in a plane perpendicular to the spin axis while the tire is mounted on a true wheel.

"Lateral tire runout": the difference between the maximum and minimum measurements parallel to the spin axis at the widest point of each sidewall of a tire on a true running wheel.

BRIEF DESCRIPTION OF THE DRAWINGS

The invention will be described by way of example and with reference to the accompanying drawings in which.

DETAILED DESCRIPTION OF THE INVENTION

Figure 1:
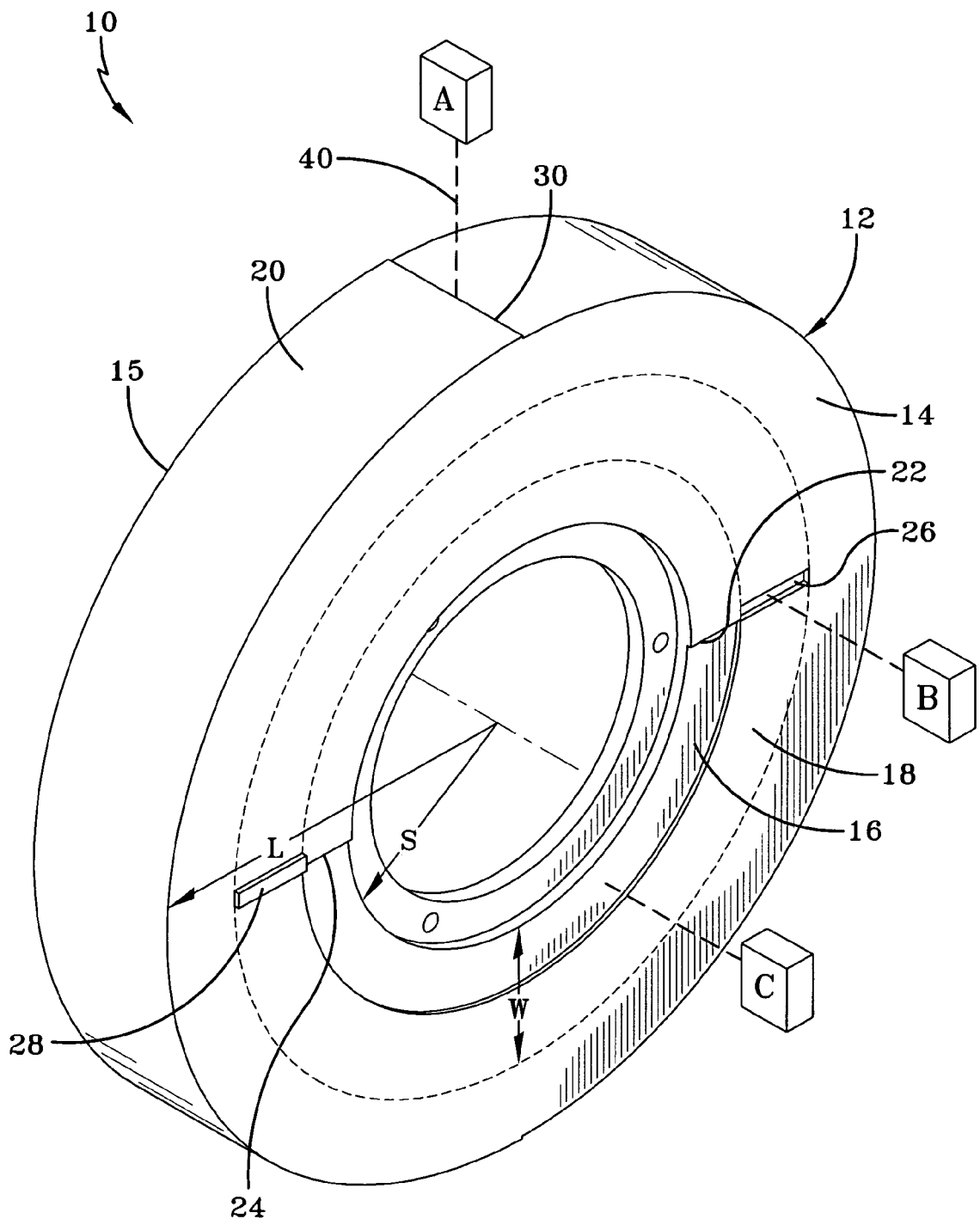
FIG. 1 is a perspective schematic view of a FVM and a sensor calibration device configured pursuant to the invention.

Referring initially to FIG. 1, a sensor calibration device 10 for a tire measuring force variation machine is shown. The device 10 includes a generally circular check plate 12 having a circular top plate surface 14 and a circular bottom plate surface 15 connected by a circumferentially extending edge surface 20. The device 10 is intended to verify the accuracy of run-out sensors on a Force Variation Machine (FVM). FVMs are used to measure the run-out limits of a tire in order verify that lateral and radial run-out do not exceed acceptable limits. The check plate may be formed from any acceptable material such as precision machined steel.

The check plate 12 is designed to mount to a specific FVM (not shown) by conventional means. The FVM is intended to measure the Lateral Runout, Radial Runout, and Bulge/alley characteristics of a production tire. Depending on whether such measurements are within preselected limits, the tire is either passed into commercial use or rejected. Design of the check plate 12 matches the mounting requirements of the FVM. The outer diameter L of the calibration check plate 12 is sized the same as the largest diameter tire the FVM is intended to test. The diameter S of the smallest tire that can be measured by the check plate 12 is identified. The distance between L and S is the test measurement region for Lateral Runout and Bulge/Valley measurements.

The test measurement region is divided into two generally equal size tracks that run circumferentially around the check plate 12. An outer track 18 is used for Bulge/Valley verification and an inner track 16 is used for Lateral Runout verification. A Radial Runout track generally co-extensive with the edge surface 20 is provided along a circumferential side of the check plate 12 extending between the top plate surface 14 and the bottom plate surface 15. The track 20 is used for Radial Runout verification.

The check plate 12 is designed to exhibit a pre-selected size of Bulge/Valley and Lateral Runout. The magnitude of the Lateral Runout and the Bulge/Valley may be set at any value but is preferably set at the acceptable limits that a tire must meet in order to be considered acceptable.

Figure 2:
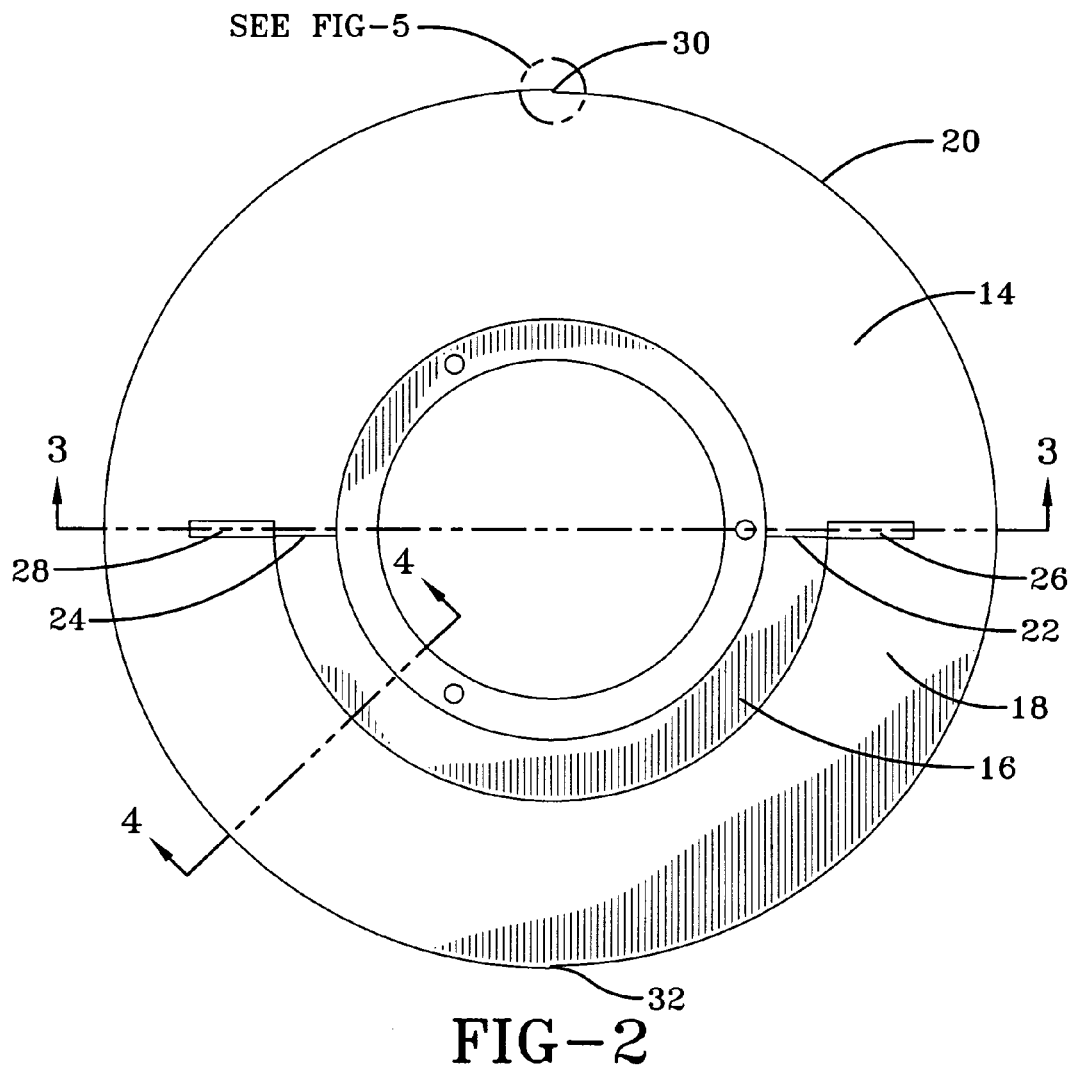
FIG. 2 is a top plan view thereof.
Figure 3:
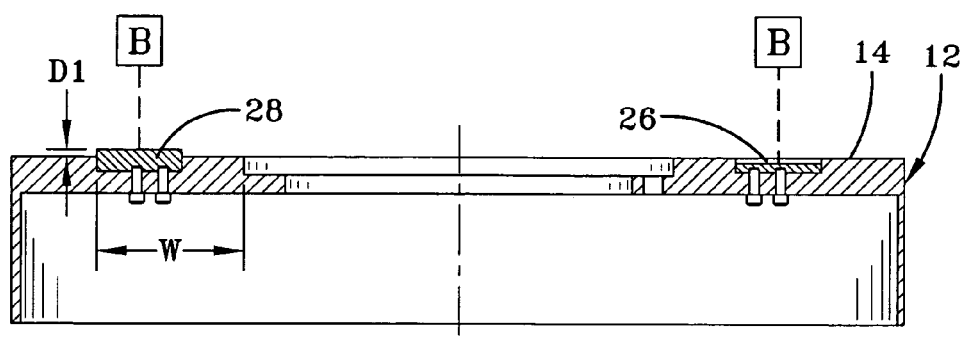
FIG. 3 is a transverse section view through the calibration device taken along the line 3-3 of FIG. 2.
Figure 4:
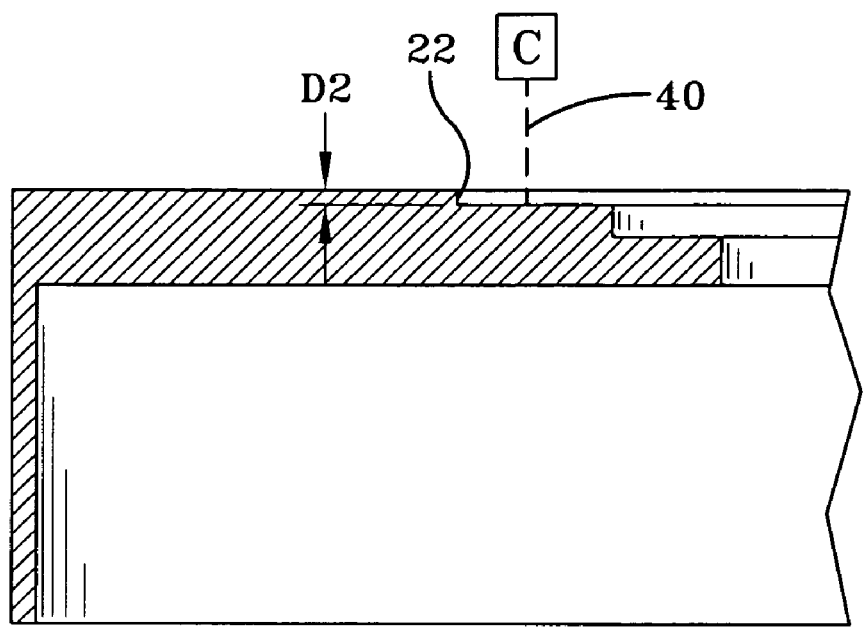
FIG. 4 is a sectional view through a portion of the calibration device taken along the line 4-4 of FIG. 2.
Figure 5:
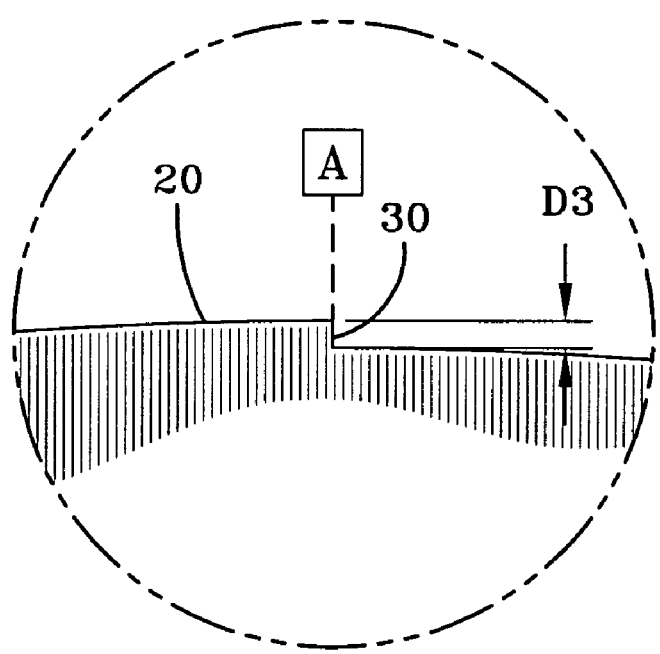
FIG. 5 is an enlarged top plan view of a portion of the calibration device as identified in FIG. 2.

Since Lateral Runout is a peak-to peak measurement, a pair of steps 22, 24 are formed within the inner track 16. With reference to FIGS. 1, 2, and 3, the steps 22, 24 have a depth D2 equivalent to the Lateral Runout level deemed to be acceptable. The steps 22, 24 are formed 180 degrees apart and divide the track 16 into inner and outer track portions of equal length. The steps 22, 24 are formed by removing material uniformly on half of the inner track 16.

The outer track 18 is adapted to provide a simulated bulge or projection 28 that spans the width of the track. A simulated valley or recess 26 is formed within track 18 preferably 180 degrees opposite the projection 28. The size of the bulge or projection 28 and recess 26 represented by the depth D1 is set to equate with the size of the Bulge/Valley and the amount of Lateral Runout that the check plate 12 will exhibit. Typically the size of the Bulge/Valley and Lateral Runout will equate with a limit deemed to be acceptable for the tire to be measured.

The width of the projection 28 and valley 26 is determined by the software algorithms that measure bulge/valley by means of a sensor. Since such features are localized undulations, they need only span a small distance such as 12 mm. The width of projection 28 and valley 26 may be designed accordingly. The valley 26 may be formed into the surface 14 by the removal of material and projection 28 may be a separate member attached to the surface 14 by suitable hardware as shown in FIG. 3.

The check plate 12 is also designed to exhibit a pre-selected size of Radial Runout. The magnitude of the radial runout may be set at any value but is preferably set at the acceptable limits that a tire must meet in order to be considered acceptable. Since Radial Runout is a peak-to peak measurement, a pair of steps 30, 32 are formed within the radial track 20. With reference to FIGS. 1, 2, and 3, the steps 30, 32 have a depth D3 equivalent to the Radial Runout level deemed to be acceptable. The steps 30, 32 are formed 180 degrees apart and divide the track 20 into inner and outer track portions of equal length. The steps 30, 32 are formed by removing material uniformly on half of the lateral runout inner track 20.

The bottom surface 15 is similarly configured as plate top surface 14 so that the two sides may allow both top and bottom sensor arrays to be calibrated and verified simultaneously. A FVM of a type in common use within the tire manufacturing industry may utilize either contacting or non-contacting sensors. FIGS. 1, 3, 4, and 5 schematically represent a three sensor non-contacting FVM arrangement. The three sensors A, B, and C may be laser sensors deployed to measure the bulge/valley, lateral runout and radial runout values in a tire. A similar sensor array may be deployed to measure surface 15 (not shown). More sensors may be utilized or sensors B and C may be combined into a single sensor as in some commercial FVM machines. The sensors A, B, and C measure by means of a laser beam 40 directed onto and reflected from a target surface. The sensor A as shown is positioned opposite track 20 to measure radial runout; sensor B opposite track 18 to measure 18 to measure bulge/valley; and sensor C opposite track 16 to measure lateral run-out.

The check plate 12 is intended to be used to calibrate the sensors A, B, and C to ensure and verify that the sensors are measuring bulge/valley, lateral, and radial runout in a tire accurately. The check plate 12 eliminates the practice of using a check tire for such purposes, a practice that can result in an incorrect calibration if the check tire is non-uniform. The sensor calibration device 10, and more specifically check plate 12, is a standard test piece in which non-uniformities (steps 22, 24, 30, 32 and projection/valley 28, 26) are accurately produced into the check plate 12 for measurement and verification of the FVM run-out sensor accuracy. The check plate 12 is a precision machined check fixture that includes precisely sized and located non-uniformities that can be detected and measured. An accurate detection and measurement will serve to verify the performance of sensors A, B, and C. When mounted properly in an FVM, the intentionally placed non-uniformities within calibration check plate 12 may be detected and measured by sensors A, B, C. Since the sizing of the steps and projection/valley features within plate 12 is known and precisely controlled, the accuracy of sensors A, B, and C may be determined.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A sensor calibration device for a tire measuring force variation machine comprising:
    a substantially circular rigid plate;
    a plurality of tracks designated on the plate including a circumferentially extending inner track and a circumferentially extending outer track radially outward from the inner track, each track having at least one respective anomaly incorporated therein configured and located to simulate a respective measured runout parameter in a tire;
    wherein the at least one inner plate track anomaly simulates lateral runout and the at least one outer plate track anomaly simulate radial runout in a tire.

2. A sensor calibration device according to claim 1, wherein the at least one inner track anomaly comprises a first and a second diametrically opposite step in a surface of the inner track dividing the inner track into inner and outer track portions; and the at least one outer track anomaly comprises a first and a second diametrically opposite step in a surface of the outer track dividing the outer track into inner and outer track portions.

3. A sensor calibration device according to claim 2, wherein a depth of the steps in the inner and outer tracks corresponds with lateral and radial runout in a tire, respectively.

4. A sensor according to claim 1, wherein further comprising a circumferentially extending intermediate track located between the inner track and the outer track, the intermediate track having a plurality of anomalies that simulate bulge and valley conditions in a tire.

5. A sensor according to claim 4, wherein the plurality of intermediate track anomalies comprise a projection and a recess disposed within a surface of the intermediate track.

6. A sensor according to claim 5, wherein a depth of the projection and recess within the intermediate track corresponds with bulge and valley conditions in a tire.

7. A sensor calibration device for a tire measuring force variation machine comprising:
   a substantially circular rigid plate;
   a plurality of tracks designated on the plate including a circumferentially extending inner track and a circumferentially extending outer track radially outward from the inner track, each track having at least one respective anomaly incorporated therein configured and located to simulate a respective measured runout parameter in a tire;
   wherein the outer track comprises a circumferentially extending radial edge track, the edge track having a first and a second step formed therein separating the edge track into outward and inward edge track portions.

8. A sensor calibration device according to claim 7 wherein the first and the second steps in the edge track are separated substantially 180 degrees apart.

9. A sensor calibration device according to claim 7, wherein the first and second steps in the radial edge track have a depth substantially equivalent to a pre-selected tire radial run-out limit.

10. A sensor calibration device according to claim 7 wherein the first and the second steps in the edge track are separated substantially 180 degrees apart.

11. A sensor calibration device according to claim 7, wherein the first and second steps in the radial edge track have a depth substantially equivalent to a pre-selected tire radial run-out limit.

12. A sensor calibration device for a tire measuring force variation machine comprising:
   a substantially circular rigid plate;
   a test measurement region designated on the plate, the test measurement region having a circumferentially extending inner track and a circumferentially extending outer track;
   the outer track having a projection and a recess formed therein;
   the inner track having a first and a second step formed therein separating the inner track into outward and inward inner track portions;
   the projection and the recess in the outer track simulating bulge and valley characteristics in a tire and the first step and the second step in the inner track simulating runout in a tire.

13. A sensor calibration device according to claim 12, wherein the test measurement region is bounded between a maximum diameter and a minimum tire diameter.

14. A sensor calibration device according to claim 12 wherein the projection and recess spans the width of the outer track.

15. A sensor calibration device according to claim 12 wherein the projection and the recess have a depth substantially equivalent to sidewall bulge and valley limits, respectively.

16. A sensor calibration device according to claim 12 wherein the first and second steps in the inner track have a depth substantially equivalent to tire lateral run-out limit.

17. A sensor calibration device according to claim 12, wherein further comprising a circumferentially extending outermost edge track, the edge track having a first and a second step formed therein separating the edge track into radially outward and inward edge track portions.

* * * * *